(12) United States Patent
Voelkening (10) Patent No.: US 11,937,594 B2
(45) Date of Patent: Mar. 26, 2024

(54) CONTROLLING UNDESIRABLE PLANTS USING ELECTRICAL ENERGY

(71) Applicant: BAYER AKTIENGESELLSCHAFT, Leverkusen (DE)

(72) Inventor: Stephan Voelkening, Berlin (DE)

(73) Assignee: BAYER AKTIENGESELLSCHAFT, Leverkusen (DE)

( * ) Notice: Subject to any disclaimer, the term of this patent is extended or adjusted under 35 U.S.C. 154(b) by 356 days.

(21) Appl. No.: 17/260,920

(22) PCT Filed: Jul. 11, 2019

(86) PCT No.: PCT/EP2019/068652
§ 371 (c)(1),
(2) Date: Jan. 15, 2021

(87) PCT Pub. No.: WO2020/016088
PCT Pub. Date: Jan. 23, 2020

(65) Prior Publication Data
US 2022/0202004 A1    Jun. 30, 2022

(30) Foreign Application Priority Data

Jul. 19, 2018  (EP) .................................... 18184470
Mar. 4, 2019   (EP) .................................... 19160443

(51) Int. Cl.
*A01M 21/04*    (2006.01)
*E01H 11/00*    (2006.01)

(52) U.S. Cl.
CPC ........... *A01M 21/046* (2013.01); *E01H 11/00* (2013.01)

(58) Field of Classification Search
CPC .... A01M 21/00; A01M 21/04; A01M 21/046; E01H 1/00; E01H 8/10
See application file for complete search history.

(56) References Cited

U.S. PATENT DOCUMENTS

| 492,635 | A | * | 2/1893 | Sharp | A01M 21/046 47/1.3 |
| 546,682 | A | * | 9/1895 | Scheible | E01H 11/00 47/1.3 |
| 565,671 | A | | 8/1896 | Cummings | |
| 2,007,383 | A | | 7/1935 | Opp | |
| 2,484,443 | A | * | 10/1949 | Baker | A01M 21/046 47/1.3 |
| 2,591,597 | A | * | 4/1952 | Opp | A01M 21/046 47/1.3 |

(Continued)

FOREIGN PATENT DOCUMENTS

| DE | 19531858 A1 | | 3/1997 | |
| DE | 19749841 A1 | * | 5/1998 | .......... A01G 27/003 |

(Continued)

OTHER PUBLICATIONS

G. Fritzsche et al., Determination of the stiffness parameters of two-layer strands, Journal, (2005), 190-207, vol. 25, Issue 3-4, Technische Mechanik.

*Primary Examiner* — Ebony E Evans
(74) *Attorney, Agent, or Firm* — Harness, Dickey & Pierce, P.L.C.

(57) ABSTRACT

The invention relates to a system, a method and the use of the system according to the invention for controlling undesirable plants, in particular on railway tracks, using electrical energy.

18 Claims, 5 Drawing Sheets

(56) References Cited

U.S. PATENT DOCUMENTS

| | | | | |
|---|---|---|---|---|
| 2,592,654 | A | * | 4/1952 | Canfield .............. A01M 1/223 43/132.1 |
| 3,919,806 | A | * | 11/1975 | Pluenneke .......... A01M 21/046 47/1.3 |
| 4,177,603 | A | * | 12/1979 | Dykes ................ A01M 21/046 47/1.3 |
| 6,237,278 | B1 | * | 5/2001 | Persson .............. A01M 21/046 47/1.3 |
| 2006/0265946 | A1 | | 11/2006 | Schwager et al. |
| 2019/0223428 | A1 | | 7/2019 | De Andrade Coutinho Filho et al. |

FOREIGN PATENT DOCUMENTS

| | | | | |
|---|---|---|---|---|
| DE | 102010042443 A1 | | 12/2011 | |
| DE | 102019006646 A1 | * | 9/2020 | .......... A01M 21/046 |
| DE | 102019008709 A1 | * | 12/2020 | .......... A01D 34/863 |
| EP | 0026248 A1 | | 4/1981 | |
| EP | 1256275 A2 | | 11/2002 | |
| EP | 3646726 A1 | * | 5/2020 | ............ A01B 39/18 |
| FR | 2487168 A1 | | 1/1982 | |
| WO | WO-2018/050143 A2 | | 3/2018 | |
| WO | WO-2018050142 A1 | * | 3/2018 | .......... A01M 21/046 |
| WO | WO-2021053086 A1 | * | 3/2021 | .......... A01M 21/046 |

\* cited by examiner

CONTROLLING UNDESIRABLE PLANTS USING ELECTRICAL ENERGY

CROSS-REFERENCE TO RELATED APPLICATIONS

This application is a U.S. national stage filing under 35 U.S.C. § 371 of International Application No. PCT/EP2019/068652, filed on Jul. 11, 2019, which claims the benefit of and priority to European Application No. 18184470.5, filed on Jul. 19, 2018, and European Application No. 19160443.8, filed on Mar. 4, 2019. The entire disclosure of each of the above applications is incorporated herein by reference.

The present invention relates to a system, a method and the use of the system according to the invention for controlling undesirable plants, in particular on track installations, using electrical energy.

Controlling plants on track installations is absolutely necessary for safety reasons. The ballast bed, in particular, must be freed and/or kept free of plant cover. The ballast bed is usually flexible and helps to transmit both static and dynamic loads uniformly to the foundation. The enumerable voids between the individual stones cushion the enormous weight of travelling trains and impacts like a buffer.

Plants and the humus held by them can clog the interspaces over time, which can jeopardize the safety of trains to a considerable degree. For safety reasons, therefore, vegetation of all kind must be kept away from the track installations.

Plant growth on track installations is usually prevented by applying herbicides. So-called spraying trains are special trains for maintaining sections of railroads. They serve to apply herbicides in order that the ballast bed does not become overgrown with weeds.

There may be areas in which application of herbicides is not desired or, for example on account of resistances, does not result in the desired success. The prior art describes alternative methods for controlling weeds on track installations, for example the use of electrical energy (see e.g. EP0026248A1, EP1256275A2, WO2018050143A2).

When controlling undesirable plants using electrical energy, the respective plant is contacted with a first electrode (also referred to as contact electrode in this description). A second electrode (also referred to as collector electrode in this description) is usually in contact with the ground in which the plant is growing. A voltage is applied between the electrodes. If the plant comes into contact with the first electrode, an electrical current flows from the first electrode through at least one part of the plant to the second electrode. If possible, the roots are also encompassed by the electrical current. This electrical shock results in weakening or destruction of the plant. The electrodes are usually fitted to a device that moves along the tracks. The electrodes are arranged such that they come into contact with plants in the region of tracks during the movement of the device. The contact results in electrical energy being transmitted to the plants, whereby the plants are rendered harmless.

In order to effectively control a plant and prevent it from spreading further, a minimum amount of electrical energy which is introduced into the plant is required.

The amount of energy can be controlled by way of the voltage and/or the contact time (the period of time during which a plant is in contact with the contact electrode). Since the voltage cannot be increased arbitrarily, particularly for safety reasons, the contact time cannot be reduced arbitrarily. This results in a limitation of the speed at which the device can move along the tracks.

The goal, however, should be control at the highest possible speed, since in the period of time in which weed control takes place in a track section, this track section is usually blocked for freight and passenger transport.

A further problem concerns the unevenesses that usually occur in track installations. The ballast bed containing the stones, sleepers and tracks and the adjacent ballast flanks present a very uneven ground surface. WO2018050143A2 proposes mounting the electrodes on a sensor-controlled height adjusting device. Such an automated mechanical adaptation of height has a comparatively high inertia, however, which has a disadvantageous effect on speed.

A further problem is posed by the rough and sharp-edged surface formed by the ballast. This surface in contact with electrodes results in high abrasion. The brush electrodes proposed in WO2018050143A2 are subjected to very high forces at increasing speed and are worn very rapidly.

Proceeding from the prior art described, the objective technical problem is to provide a device and a method for controlling undesirable plants, in particular on track installations, which allow a high speed during control and minimize the negative consequences of abrasion.

This problem is solved by the subjects of the independent patent claims. Preferred embodiments are found in the dependent patent claims and in the present description.

A first subject of the invention is a system comprising
  at least one contact electrode,
  at least one collector electrode,
  at least one voltage source for applying a voltage between the at least one contact electrode and the at least one collector electrode, and
  means for moving the system in a direction of movement,
  wherein the at least one contact electrode is fitted in a suspended fashion,
  wherein a bending stiffness of the at least one contact electrode with respect to an external force that acts on the at least one contact electrode counter to the direction of movement is lower than a bending stiffness of the at least one contact electrode with respect to an external force that acts on the at least one contact electrode transversely relative to the direction of movement.

A further subject of the invention is the use of the system according to the invention for controlling plants on railroad lines or track installations.

A further subject of the invention is a method comprising the steps of
  providing a system, wherein the system comprises:
    at least one contact electrode,
    at least one collector electrode,
    at least one voltage source for applying a voltage between the at least one contact electrode and the at least one collector electrode, and
    means for moving the system in a direction of movement,
    wherein the at least one contact electrode is fitted in a suspended fashion,
    wherein a bending stiffness of the at least one contact electrode with respect to an external force that acts on the at least one contact electrode counter to the direction of movement is lower than a bending stiffness of the at least one contact electrode with respect to an external force that acts on the at least one contact electrode transversely relative to the direction of movement,
  applying a voltage between the at least one contact electrode and the at least one collector electrode, moving the system over a region of earth in which plants are situated, and in the process
contacting the at least one contact electrode with at least one part of at least one plant,
contacting the at least one collector electrode
   a) with the ground in which the at least one plant is growing, and/or
   b) with another part of the at least one plant, and/or
   c) with at least one part of a neighboring plant,
      wherein a current flows between the at least one contact electrode and the at least one collector electrode, which current flows at least through a part of the at least one plant and weakens or destroys the at least one plant.

The invention is explained in greater detail below without differentiating between the subjects of the invention (system, use, method). The explanations below are intended, rather, to be applicable to all the subjects of the invention in an analogous way, irrespective of the context (system, use, method) in which they are given.

When steps are mentioned in an order in the present description or in the patent claims, this does not necessarily mean that the invention is restricted to the order mentioned. Rather, it is conceivable that the steps can also be carried out in a different order or else in parallel with one another; unless one step is developed on the basis of another step, which makes it absolutely necessary for the developmental step to be carried out afterward (but this becomes clear in the individual case). The orders mentioned thus represent preferred embodiments of the invention.

At least one contact electrode, at least one collector electrode and at least one voltage source for applying an electrical voltage between the contact electrode and the collector electrode are required for carrying out the invention.

Furthermore, means are required which move the at least one contact electrode over a region of earth (ground) in which at least one plant that is intended to be controlled is situated.

The stated elements (contact electrode, collector electrode, voltage source, means for movement) can be parts of a single device. The device can be a rail vehicle; however, it can also be a road vehicle (e.g. Unimog) having means for moving on rails or along rails (see e.g. FIG. 1 in EP0026248A1).

The stated elements (contact electrode, collector electrode, voltage source, means for movement) can be separate objects that are joined together in order to carry out the method according to the invention. In particular, the means for moving the system according to the invention can be an autonomous device (a vehicle). It is conceivable, for example, for the system according to the invention to comprise a portable device (plant controlling unit) comprising the at least one contact electrode, the at least one collector electrode and the at least one voltage source. The plant controlling unit can be fitted to a rail vehicle or to a vehicle which can move on or along rails and which is a separate part of the system according to the invention. It is furthermore conceivable for the system according to the invention to comprise a plurality of separate parts (elements) that are fitted individually to a rail vehicle or a vehicle which can move on or along rails in order to implement the invention. The voltage source can be one such element, one contact electrode or a plurality of contact electrodes can be a further element, and one collector electrode or a plurality of collector electrodes can be a further element.

The at least one contact electrode is that electrode which is contacted with a plant in order to introduce electrical energy into the plant and thereby to prevent the plant from spreading further; it is killed in the optimum case and otherwise weakened.

Preferably, a plurality of contact electrodes are present. The number of contact electrodes is preferably in the range of 10 to 1000.

The at least one contact electrode according to the invention is fitted in a suspended fashion, that is to say that one part of the contact electrode is fixed to the system according to the invention (either directly or by way of further elements), while another part of the contact electrode is drawn in the direction of the ground on account of the gravitational force. Depending on the length of the contact electrode, it is suspended above the ground or a part of the contact electrode ends up resting on the ground.

It is conceivable for the at least one contact electrode to be embodied such that it touches the ground; however, it is also conceivable for the at least one contact electrode to be embodied such that it does not touch the ground.

Preferably, the at least one contact electrode according to the invention is embodied such that its length can be made variable. It is conceivable, for example, for the contact electrode to be wound on a coil and for the length of the contact electrode to be able to be varied by a larger or smaller part of the contact electrode being unwound from the coil. By virtue of the variable length of the contact electrode, the distance between the lower end (facing the ground) of the contact electrode and the ground can be varied (for the case where the contact electrode does not touch the ground) or the size of the area of the contact electrode bearing on the ground can be varied (for the case where the contact electrode touches the ground). The variable length of the contact electrode furthermore makes it possible to determine which plants (with regard to their size) are encompassed by the electrode (and/or which parts of the plants are encompassed) and respectively which are not encompassed; if the end of the contact electrode facing the ground is suspended too high, it does not reach smaller plants.

In one preferred embodiment, the distance between the lower end (facing the ground) of the contact electrode and the ground in the case of a stationary device (stationary with respect to the surface of the earth) is in the range of −0.5 meter to 0.5 meter. In this case, a negative distance (e.g. −0.5 meter) means that the contact electrode is touching the ground and that the region of the contact electrode that is in contact with the ground has a corresponding length (e.g. of 0.5 meter). Particularly preferably, the distance is −0.3 meter to 0.05 meter.

The at least one contact electrode is embodied in a flexible fashion. That means that the shape of the contact electrode can be changed by a force acting externally. The flexibility of a body can be specified by its stiffness. Stiffness describes the resistance of a body to elastic deformation as a result of an external force or a moment (bending moment or torsional moment, depending on loading). There are accordingly different types of stiffnesses: extensional, bending and torsional stiffnesses. The higher the stiffness, the less flexible a body is.

For this section it is assumed that the contact electrode embodied in a suspended fashion is touching the ground. If such a contact electrode is moved in a direction of movement in relation to the ground, the contact electrode sweeps over the ground. The lower the bending stiffness, the lower the resistance offered by the contact electrode to the movement; the lower the bending stiffness, the more easily the contact electrode can avoid obstacles; the forces acting on the contact electrode are reduced by the avoidance, and abrasion is reduced.

The same analogously applies to contact electrodes which do not touch the ground but strike plants/plant parts during a movement of the device. If the contact electrodes were embodied in a rigid fashion, upon striking a plant they would offer a maximum resistance to the movement and wear very rapidly as a result. In addition, a low bending stiffness (high flexibility) has the effect that during the movement of the system according to the invention a contact electrode sweeps over plants/plant parts and in the process is in contact with the plant for a longer period of time. Such a contact time lengthened as a result of a low bending stiffness means that the speed of movement can be correspondingly increased, without the energy input into the plant being reduced.

The at least one contact electrode according to the invention is characterized in that it has a lower bending stiffness in one dimension than in another dimension (anisotropy with regard to the bending stiffness). For elucidating the invention, in the present description dimensions and directions are defined predominantly with reference to the direction of movement of the system according to the invention.

Preferably, the bending stiffness with respect to a force that acts on the contact electrode in a direction counter to the direction of movement of the system according to the invention is greater than 10 mN measured according to DIN 53 121 at 15° and 10 mm, and less than 200 kNmm$^2$ (for the measurement method, see G. Fritzsche et al.; TECHNISCHE MECHANIK [TECHNICAL MECHANICS], volume 25, issue 3-4, (2005), 190-207). Further measurement methods for determining the bending stiffness of various test specimens are described for example in DE19531858A1 and DE102010042443A1 and the publications cited therein.

In one preferred embodiment, the contact electrode is embodied in a symmetrical fashion, such that the bending stiffness of the contact electrode with respect to a force that acts on the contact electrode in the direction of the direction of movement corresponds to the bending stiffness of the contact electrode with respect to a force that acts oppositely to the direction of movement. This makes it possible to operate the system according to the invention in the two opposite directions of movement on rails (forward and backward).

The bending stiffness of a contact electrode according to the invention is greater with respect to a force that acts on the contact electrode transversely with respect to the direction of movement than with respect to a force that acts on the contact electrode oppositely to the direction of movement. The term "transversely with respect to the direction of movement" is defined here as follows: on a planar path the direction of movement and the direction opposite to the direction of movement extend at 180° relative to one another and in each case perpendicularly to the gravitational force. In such a case, the direction "transversely with respect to the direction of movement" extends both perpendicularly (at an angle of 90° or 270°) to the direction of movement and perpendicularly (at an angle of 90° or 270°) to the gravitational force. Direction of movement, direction of the gravitational force and the direction transversely with respect to the direction of movement form a cartesian coordinate system.

The increased bending stiffness with respect to an external force transversely (at an angle of 90° or 270°) relative to the direction of movement has the effect that a contact electrode is deflected only slightly from its equilibrium position when traversing curves on account of the centrifugal force. This reduces the risk of the contact electrode, when traversing curves, coming into contact with the tracks, with parts of the system according to the invention and/or with other bodies that may be situated on track installations (e.g. poles). During a movement of the system according to the invention, a contact electrode embodied in a suspended fashion thus pivots predominantly forward and backward (in the direction of movement and counter to the direction of movement) and to a lesser extent toward the side (transversely with respect to the direction of movement).

Preferably, the bending stiffness of the at least one contact electrode with respect to an external force that acts on the contact electrode transversely relative to the direction of movement of the system according to the invention is at least a factor of 10 greater than the bending stiffness of the contact electrode with respect to an external force that acts on the contact electrode oppositely to the direction of movement of the system according to the invention; particularly preferably, it is at least a factor of 20 greater, even more preferably at least a factor of 30 greater, even more preferably at least a factor of 40 greater, very particularly preferably at least a factor of 50 greater.

Preferably, the bending stiffness of the at least one contact electrode with respect to an external force that acts on the contact electrode transversely relative to the direction of movement of the system according to the invention is greater than 200 kNmm$^2$ (for the measurement method, see G. Fritzsche et al.; TECHNISCHE MECHANIK, volume 25, issue 3-4, (2005), 190-207).

Preferably, the bending stiffness is determined at least proportionally by way of the shape of the contact electrode. The contact electrode preferably has the shape of a strip. A strip is a parallelepipedal or approximately parallelepipedal body, having a length L, a width B and a thickness D, wherein the length L is a multiple of the width B and the width B is greater than the thickness D. In the present case of a contact electrode according to the invention, the length extends along the direction of the gravitational force (at least in the case of a freely suspended contact electrode that is not touching the ground), the thickness extends along the direction of movement and the width extends transversely relative to the direction of movement. In the present case of a contact electrode according to the invention, the length L is at least ten times the width B and the width B is at least three times the thickness D.

In one preferred embodiment, the at least one contact electrode is a body having a length L, a width B and a thickness D, wherein L≥10·B and B≥3·D and wherein the resistance offered by the contact electrode to a force in the direction of the width is greater than the resistance offered by the contact electrode to a force in the direction of the thickness by a factor of at least 10, preferably at least 20, even more preferably at least 30, even more preferably at least 40, most preferably at least 50.

In one preferred embodiment, the contact electrode comprises a body composed of braided and/or twisted metal wires.

In a further preferred embodiment, the contact electrode comprises a body composed of a metal sheet.

A combination of braided and/or twisted metal wires and one or more metal sheets is also conceivable.

Preferably, a plurality of contact electrodes are arranged (in lamellar fashion) next to one another (transversely or obliquely relative to the direction of movement) (as in the case of a curtain). In this case, the contact electrodes can be arranged such that they are spaced apart from one another (at a constant distance or varying distances), terminate flush with one another or partly overlap one another. Mixed forms are also conceivable. The term "obliquely relative to the direction of movement" includes all directions that correspond neither to the direction of movement nor to the direction transversely relative to the direction of movement. Preferably, a direction "obliquely relative to the direction of movement" lies in the plane spanned by the direction of movement and the direction transversely relative to the direction of movement.

A plurality of contact electrodes arranged next to one another can have the same length; however, the lengths can also vary.

A plurality of contact electrodes arranged next to one another can have the same bending stiffness transversely and/or oppositely to the direction of movement and/or in the direction of movement; however, the bending stiffnesses can also vary.

A plurality of contact electrodes arranged next to one another can have the same thickness; however, the thicknesses can also vary.

A plurality of contact electrodes arranged next to one another can have the same width; however, the widths can also vary.

A plurality of contact electrodes arranged next to one another can have the same shape; however, the shapes can also vary.

A plurality of contact electrodes arranged next to one another can comprise the same material; however, the materials can also vary.

In one preferred embodiment, a plurality of contact electrodes are arranged in lamellar fashion next to one another (transversely or obliquely relative to the direction of movement), wherein the contact electrodes each have a length dimensioned such that the distance between the lower end (facing the ground) of the contact electrodes and the ground in the case of a stationary device (stationary with respect to the surface of the earth) is in the range of −0.5 meter to 0.5 meter. In this case, a negative distance (e.g. −0.5 meter) means that the contact electrode is touching the ground and that the region of the contact electrode that is in contact with the ground has a corresponding length (e.g. of 0.5 meter). Particularly preferably, the distance is −0.3 meter to 0.05 meter.

In one preferred embodiment, a plurality of rows (at least two, preferably three to twenty) of contact electrodes arranged in lamellar fashion next to one another (transversely or obliquely relative to the direction of movement) are arranged such that they are spaced apart from one another in the direction of movement. In this case, the contact electrodes can be configured such that when the device according to the invention passes over a patch of plants on a track installation, a contact electrode in a back row makes contact with a plant at a point in time at which a contact electrode in a front row just loses contact with the plant. By virtue of contact electrodes being strung along the direction of movement in such a way and by virtue of the sequential contacting of plants with individual contact electrodes that is achieved as a result, the integral contact time (and thus the cumulative input of electrical energy) is increased. In one preferred embodiment, the rows of contact electrodes are arranged parallel to one another.

When the contact electrodes are used according to the invention, it is customary for the contact electrodes to wear over time. It is customary for the lengths of the contact electrodes to decrease over the course of time when in use. It is conceivable for material of the contact electrode to be eroded on account of abrasion; it is conceivable for part of the contact electrode to be torn away.

In one particularly preferred embodiment of the present invention, there is a dispensing device present that feeds contact electrode material if the length of a contact electrode has decreased. It is conceivable, for example, for the contact electrode to be wound on a coil. If the length of the contact electrode has decreased on account of wear, the coil unwinds part of the wound-up contact electrode until the original length is reached again.

The feeding of contact electrode material in order to compensate for wear can be effected manually (by a user of the system according to the invention). It is conceivable, for example, for the lengths of the individual contact electrodes to be checked after a use of the system according to the invention. In the case of those contact electrodes whose lengths have decreased on account of wear, contact electrode material is fed until the lengths correspond to the original length again. It is also conceivable for lower parts of contact electrodes to be separated, for example because they are greatly stressed on account of abrasion and their functionality is limited or they threaten to drop off soon. After separation of the lower parts, the original length is set again by feeding contact electrode material.

In one preferred embodiment, the feeding of contact electrode material is effected automatically. Sensors detect the lengths of the individual contact electrodes and feed contact electrode material if the lengths have decreased on account of wear. It is also conceivable for worn lower parts of contact electrodes to be separated in an automated manner if sensors detect such wear.

Suitable sensors include for example optical sensors (for example one or more cameras or light barriers). Also conceivable are sensors that measure the weight of the contact electrodes, which decreases in the case of tearing-off. It is also conceivable for the currents that flow through a contact electrode to be measured. Changes in the length of a contact electrode may also become apparent in the measured currents.

The at least one collector electrode can be fashioned, in principle, in just the same way as the at least one contact electrode and as described in this description. Equally, a plurality of collector electrodes can be fashioned in just the same way as a plurality of contact electrodes and as described in this description. Everything described with regard to one or more contact electrodes in this description is also conceivable for one or more collector electrodes and applicable thereto.

Preferably, the at least one collector electrode is in contact with the ground or with one of the rails or both rails.

In one preferred embodiment, a plurality of collector electrodes are arranged next to one another (transversely or obliquely relative to the direction of movement), wherein the collector electrodes are fitted to the device in a suspended fashion, and/or wherein the collector electrodes have a lower bending stiffness counter to the direction of movement than transversely relative to the direction of movement, and/or wherein the collector electrodes are configured such that they touch the ground, and/or wherein the collector electrodes are made variable in their length and/or there is a dispensing device present that feeds/can feed collector electrode material.

Preferably, the at least one collector electrode is arranged behind the at least one contact electrode in the direction of movement.

The at least one collector electrode and/or the at least one contact electrode can each be provided partly with a sheathing that serves as an electrical insulator and is intended to prevent a short circuit if the at least one collector electrode and the at least one contact electrode touch one another. Such a sheathing preferably extends from an upper region of the at least one collector electrode and/or of the at least one contact electrode as far as a central or lower region of the at least one collector electrode and/or of the at least one contact electrode, wherein the bottommost region of the at least one collector electrode and/or of the at least one contact electrode remains free of a sheathing.

In a further preferred embodiment, the at least one collector electrode is in contact with one rail or with both rails. It is conceivable, for example, for the collector electrode to be embodied as a wheel that runs on a rail. In such a case, the wear of collector electrode material is very low. In such a case, a current flows from the contact electrode via a part of a plant that is in contact with the contact electrode, via a region in the ground to a rail and from there to the collector electrode.

The voltage source can be a voltage source driven by a generator. The use of rechargeable batteries is also conceivable. In one preferred embodiment, the voltage is obtained from the overhead line. In such a case, a current collector is a part of the system according to the invention that can be in contact with the overhead line in order, proceeding therefrom, to build up a voltage between the at least one contact electrode and the at least one collector electrode.

The voltage between the at least one contact electrode and the at least one collector electrode can be a DC voltage or an AC voltage. Preference is given to an AC voltage.

In one preferred embodiment, nozzles for applying one or more fluids in the form of vapor, droplets and/or one or more jets are present in the front region of the system according to the invention. Preferably, such a fluid is water, to which substances that result in an increase in the electrical conductivity can be added. The addition of crop protection compositions (e.g. herbicides) is also conceivable.

Preferably, the current that flows between the at least one contact electrode and the at least one collector electrode is measured. If the current is too low despite a multiplicity of plants that come into contact with the at least one contact electrode during a movement of the system, it is conceivable that the region of earth in which the plants are situated and/or the plants are/is too dry. It is conceivable to provide a controller which, in the event of an excessively low current intensity, applies fluid to a track section of the track installation before the at least one contact electrode reaches the corresponding track section during a movement of the system according to the invention. It is also conceivable for the degree of moisture of a track section to be determined by other sensors, for example optical sensors.

Preferably, an extinguishing apparatus is fitted in the rear region of the device. When controlling plants using electrical energy, sparking can occur, which can kindle a fire if the track installation is in a dry state. Sensors that detect sparks and/or fire and pass a corresponding signal to a control unit are preferably fitted to the device. The control unit is configured such that, in the event of a corresponding signal, it causes the extinguishing apparatus to apply an extinguishing composition. Suitable sensors include, in particular, optical sensors (e.g. cameras) that detect the electromagnetic radiation emanating from sparks and/or fire.

Preferably, one or more cameras that take photographs of the track installation and pass them to an evaluation unit are fitted in the front region of the device. The evaluation unit is configured to analyze the photographs and to recognize/identify plants and/or plant species on the track installation. Preference is given to determining the size of the plants in the photograph. The results of the analysis are fed to a control unit. It is conceivable for the control unit to adapt the length of the contact electrodes and/or of the collector electrodes to the size of the plants. Preferably, voltage is applied between the at least one contact electrode and the at least one collector electrode if plants are identified on the track installation and/or if a minimum quantity of plants are identified in the track installation and/or if plants having a minimum size are identified and/or if defined plant species are identified. It is also conceivable for electricity parameters (in particular voltage and/or frequency) to be adapted to the things identified.

Preferably, sensors that detect the constitution and/or form of the track installation situated ahead and transmit signals to a control unit are present in the front region of the device. It is conceivable for the control unit to adapt the length of the at least one contact electrode and/or of the at least one collector electrode and/or voltage parameters (in particular voltage and/or frequency) to the constitution and/or form of the track installation situated ahead.

Preferred embodiments of the present invention are:

1. A device comprising
   means for moving the device in a direction of movement,
   at least one contact electrode,
   at least one collector electrode,
   at least one voltage source for applying a voltage between the at least one contact electrode and the at least one collector electrode,
   wherein the at least one contact electrode is fitted to the device in a suspended fashion,
   wherein the at least one contact electrode has a lower bending stiffness counter to the direction of movement than transversely relative to the direction of movement.

2. The device according to embodiment 1, wherein the device is a rail vehicle or a vehicle having means for moving on or along rails.

3. The device according to embodiment 1, comprising a plant controlling unit and a rail vehicle or a vehicle that can move on or along rails, wherein the plant controlling unit is reversibly connected to the rail vehicle/vehicle.

4. The device according to any of the preceding embodiments, comprising a plurality of contact electrodes, preferably 10 to 1000 contact electrodes.

5. The device according to any of the preceding embodiments, wherein the length of the at least one contact electrode can be made variable.

6. The device according to any of the preceding embodiments, wherein the at least one contact electrode is wound on a coil and the length of the at least one contact electrode can be increased by unwinding and decreased by winding.

7. The device according to any of the preceding embodiments, wherein the at least one contact electrode has a length L, a width B and a thickness D, wherein the length L extends along the direction of the gravitational force, the thickness D extends along the direction of movement and the width B extends transversely relative to the direction of movement and wherein the length L is at least ten times the width B and the width B is at least three times the thickness D.

8. The device according to any of the preceding embodiments, wherein the at least one contact electrode comprises a body composed of braided and/or twisted metal wires.

9. The device according to any of the preceding embodiments, wherein a plurality of contact electrodes are arranged next to one another in lamellar fashion transversely or obliquely relative to the direction of movement.

10. The device according to any of the preceding embodiments, wherein the at least one contact electrode has a length dimensioned such that the distance between the lower end—facing the ground—of the contact electrodes and the ground in the case of a stationary device is in the range of −0.5 meter to 0.5 meter, wherein a negative distance means that the contact electrode is touching the ground and that the region of the contact electrode that is in contact with the ground has a corresponding length.

11. The device according to any of the preceding embodiments, wherein a plurality of rows of contact electrodes arranged in lamellar fashion next to one another, transversely or obliquely relative to the direction of movement, are arranged such that they are spaced apart from one another in the direction of movement.

12. The device according to any of the preceding embodiments, comprising a dispensing device that feeds contact electrode material if the length of a contact electrode has decreased.

13. The device according to any of the preceding embodiments, comprising a separating device that separates worn contact electrode material.

14. The device according to any of the preceding embodiments, comprising a plurality of collector electrodes arranged next to one another, transversely or obliquely relative to the direction of movement, wherein the collector electrodes are fitted to the device in a suspended fashion and/or wherein the collector electrodes have a lower bending stiffness counter to the direction of movement than transversely relative to the direction of movement and/or wherein the collector electrodes are configured such that they touch the ground and/or wherein the collector electrodes can be made variable in their length and/or there is a dispensing device present that feeds worn collector electrode material, and/or there is a separating device present that separates worn collector electrode material.

15. The device according to any of the preceding embodiments, wherein the at least one collector electrode is arranged behind the at least one collector electrode in the direction of movement.

16. The device according to any of the preceding embodiments, wherein the at least one collector electrode is in contact with one rail or with both rails.

17. The device according to any of the preceding embodiments, wherein the voltage source is a generator and/or a rechargeable battery.

18. The device according to any of the preceding embodiments, wherein the voltage is obtained from an overhead line.

19. The device according to any of the preceding embodiments, comprising an extinguishing apparatus in the rear region of the device and one or more sensors for detecting sparks and/or fire and a control unit, which causes the extinguishing apparatus to release an extinguishing composition if sparks and/or fire are/is detected by means of the one or more sensors.

20. The device according to any of the preceding embodiments, comprising one or more sensors for determining the length and/or a degree of wear of the at least one contact electrode and/or of the at least one collector electrode.

21. The device according to any of the preceding embodiments, comprising one or more sensors for determining the constitution and/or form of the track installation situated ahead, and a control unit configured to adapt the length of the at least one contact electrode and/or of the at least one collector electrode and/or voltage parameters to the constitution and/or form of the track installation situated ahead.

22. The use of the device according to any of the preceding embodiments for controlling weeds on railroad lines.

23. A method comprising the steps of
providing a device, wherein the device comprises:
    means for moving the device in a direction of movement,
    at least one contact electrode,
    at least one collector electrode,
    at least one voltage source for applying a voltage between the at least one contact electrode and the at least one collector electrode,
        wherein the at least one contact electrode is fitted to the device in a suspended fashion,
        wherein the at least one contact electrode has a lower bending stiffness counter to the direction of movement than transversely relative to the direction of movement.
applying a voltage between the at least one contact electrode and the at least one collector electrode,
moving the device over a region of earth in which plants are situated, and in the process
contacting the at least one contact electrode with at least one plant, wherein a current flows between the contact electrode and the at least one collector electrode, which current at least partly flows through the plant.

24. The method according to embodiment 23, wherein the device provided is a device according to any of claims 1 to 22.

25. The method according to either of embodiments 23 and 24, furthermore comprising the steps of
measuring the current intensity flowing between the at least one contact electrode and the at least one collector electrode,
altering the length of the at least one contact electrode or of the at least one collector electrode, such that an altered current intensity corresponding to a desired range is established.

26. The method according to any of embodiments 23 to 25, furthermore comprising the steps of
measuring the degree of moisture of a track section and
applying a fluid to the track section, for the case where the degree of moisture is below a desired range.

27. A system comprising
at least one contact electrode,
at least one collector electrode,
at least one voltage source for applying a voltage between the at least one contact electrode and the at least one collector electrode, and
means for moving the system in a direction of movement,
wherein the at least one contact electrode is fitted to the system in a suspended fashion, by an upper part of the at least one contact electrode being fixed to the system, while a lower part is drawn in the direction of the ground on account of the gravitational force,
wherein the at least one contact electrode has a length L, a width B and a thickness D,
wherein the length L extends along the direction of the gravitational force, the thickness extends along the direction of movement and the width extends transversely relative to the direction of movement,
wherein the length L is at least ten times the width B and the width B is at least three times the thickness D.

28. System according to embodiment 27, wherein the length of the at least one contact electrode is variable.

29. System according to embodiment 27, wherein the distance between a lower end of the at least one contact electrode and the ground is variable.

30. System according to embodiment 27, wherein the lower part of the at least one contact electrode
   touches the ground, or
   ends at a distance from the ground and does not touch the ground, wherein the distance in the region of the lower part relative to the ground is greater than zero and less than 0.5 meter.

31. System comprising
   a plurality of contact electrodes arranged next to one another,
   at least one collector electrode,
   at least one voltage source for applying a voltage between the at least one contact electrode and the at least one collector electrode, and
   means for moving the system in a direction of movement,
   wherein the contact electrodes are fitted to the system in a suspended fashion,
   wherein the contact electrodes are flexible.

32. System according to any of embodiments 27 to 31, comprising at least two rows of contact electrodes arranged next to one another, wherein the rows are arranged such that they are spaced apart from one another in the direction of movement.

33. System according to any of embodiments 27 to 32, comprising an extinguishing apparatus, a control unit and at least one sensor, wherein the extinguishing apparatus is arranged behind the contact electrodes in the direction of movement, wherein the at least one sensor is configured to detect sparks and/or fire and to communicate a spark signal and/or fire signal to the control unit, wherein the control unit is configured to cause the extinguishing apparatus to release an extinguishing composition in the event of a spark signal and/or fire signal.

34. System according to any of embodiments 27 to 32, comprising a control unit, an evaluation unit and at least one camera, wherein the at least one camera takes photographs of a region situated in front of the system in the direction of movement and communicates the photographs to the evaluation unit, wherein the evaluation unit is configured to determine a property parameter in the photographs and to communicate the property parameter to the control unit, wherein the control unit is configured to receive the property parameter and to adapt a control parameter to the property parameter.

35. System according to embodiment 34, wherein the property parameter is the height of at least one plant and the control parameter is the length of at least one contact electrode or the distance between a lower end of at least one contact electrode and the ground.

36. System according to embodiment 34, wherein the property parameter is a plant species and the control parameter is a voltage and/or an AC voltage frequency.

37. System according to embodiment 34, wherein the property parameter is a type of ground and the control parameter is a voltage and/or an AC voltage frequency.

38. System according to embodiment 34, wherein the property parameter is a degree of moisture of the ground and the control parameter is a voltage and/or an AC voltage frequency and/or an amount of fluid applied in the region.

39. System according to any of embodiments 27 to 38, wherein the at least one contact electrode does not touch the ground, wherein the at least one collector electrode touches the ground, wherein a sheathing that acts as an electrical insulator is fitted around the at least one collector electrode, wherein the sheathing extends over a length corresponding at least to the length of the at least one contact electrode, wherein a lower region of the at least one collector electrode that is in contact with the ground has no sheathing.

The invention is explained in greater detail below with reference to drawings, without any desire for the invention to be restricted to the features and feature combinations shown in the drawings.

In the figures:

Figure 1:
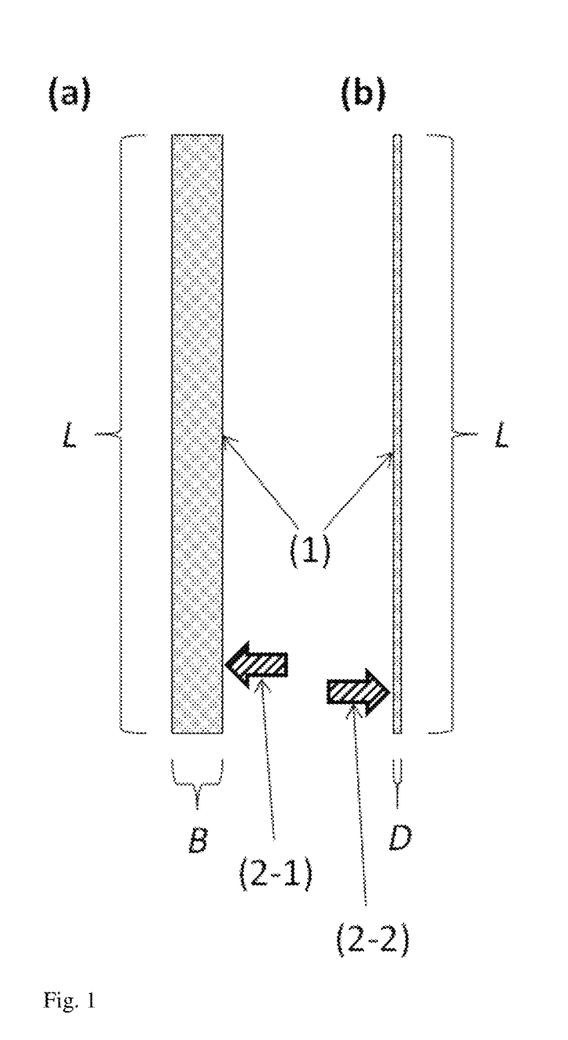

FIG. 1 shows by way of example and schematically an electrode (a contact electrode and/or collector electrode). FIG. 1(a) shows the electrode in a frontal view; FIG. 1(b) shows the electrode in a side view. The electrode (1) has the shape of a strip. The electrode (1) has a length L, a width B and a thickness D.

The length L of the electrode is greater than the width B by a multiple and the width B is greater than the thickness D by a multiple. This shape has the effect that the size of the resistance offered by the electrode to an external force depends on the direction in which the force acts on the electrode. If a force acts on the electrode in direction (2-1) along the width, then the resistance offered by the electrode to this force is greater than the resistance offered by the electrode to a force that acts on the electrode in direction (2-2) along the thickness.

The electrode (1) is embodied in a symmetrical fashion. It has two mirror planes: a first mirror plane is spanned by the length L and the width B; a second mirror plane is spanned by the length L and the thickness D. The symmetry with respect to the first mirror plane has the effect that the bending stiffness of the electrode (1) with respect to a force that acts on the electrode in direction (2-2) is of just the same magnitude as the bending stiffness of the electrode (1) with respect to an analogous force that acts on the electrode counter to the direction (2-2). The symmetry with respect to the second mirror plane has the effect that the bending stiffness of the electrode (1) with respect to a force that acts on the electrode in direction (2-1) is of just the same magnitude as the bending stiffness of the electrode (1) with respect to an analogous force that acts on the electrode counter to the direction (2-1).

Figure 2:
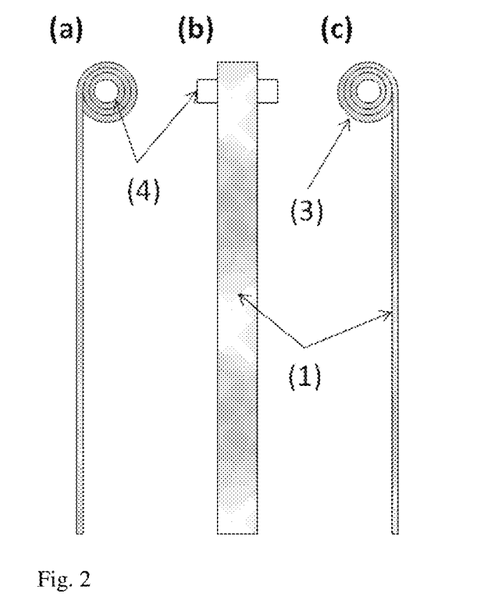

FIG. 2 shows by way of example and schematically a further embodiment of an electrode (contact electrode and/or collector electrode). FIG. 1(a) shows the electrode in a side view; FIG. 1(b) shows the electrode in a frontal view. FIG. 1(c) shows the electrode in a further side view.

The electrode (1) is wound in the form of a coil (3) on a coil core (4). The length of the electrode can be increased by unwinding electrode material from the coil. The length of the electrode can be decreased by winding electrode material on the coil. Electrode material lost in the form of wear can be replaced by unwinding electrode material from the coil. It should be noted that the drawing program used to create FIG. 2 was unable to generate a spiral, and so the coil windings look like concentric circles. The correct appearance of a coil is clear, however, to the person skilled in the art. FIG. 2, like the other figures as well, serve merely for elucidating the invention and do not constitute technical drawings for design purposes.

Figure 3:
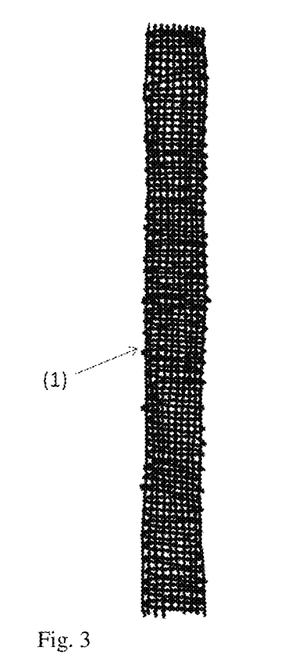

FIG. 3 shows by way of example and schematically one preferred embodiment of an electrode (contact electrode and/or collector electrode). The electrode (1) is embodied as a braiding of metal wires.

Figure 4:
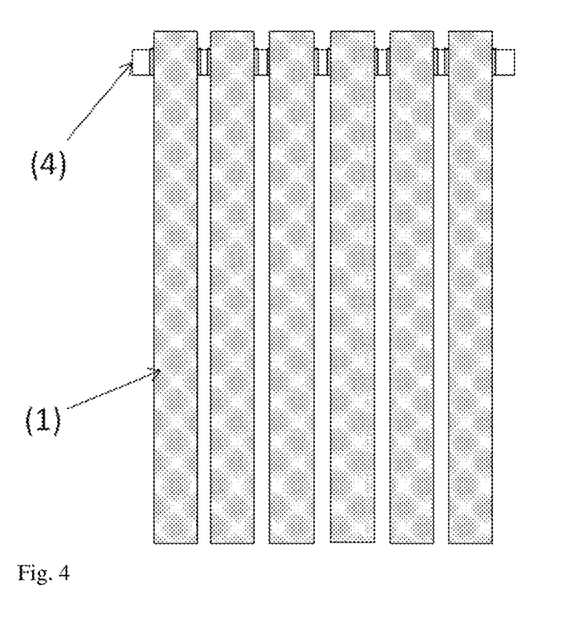

FIG. 4 shows by way of example and schematically one preferred arrangement of a plurality of electrodes (in each case contact electrodes and/or in each case collector electrodes). The electrodes are arranged in lamellar fashion next to one another and at a constant distance from one another.

The electrodes are rolled up on a coil core (4) and can be wound and unwound independently of one another.

Figure 5:
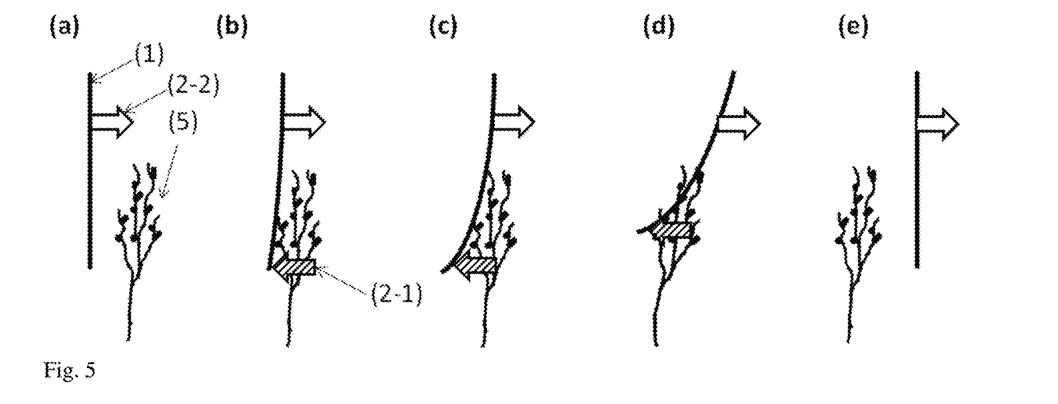

FIG. 5 shows by way of example and schematically in a temporal sequence how a contact electrode is moved in one direction and impinges on a plant in the process.

FIG. 5 comprises five individual illustrations (a), (b), (c), (d) and (e). The individual illustrations are to represent a temporal sequence: (a)→(b)→(c)→(d)→(e). From one individual illustration to the next individual illustration a contact electrode (1) moves in a direction (2-2) and in the process impinges on a stationary (immobile) plant (5). In FIG. 5(*a*) the contact electrode (1) is still at a distance from the plant (5) and is moving toward the latter. In FIG. 5(*b*) the contact electrode (1) impinges on the plant (5). By virtue of the fact that the contact electrode (1) is moving in the direction (2-2), but the plant (5) is immobile, an external force acts on the contact electrode (1) in a direction (2-1) opposite to the direction of movement. The contact electrode has a specific bending stiffness that offers a resistance to the force. The bending stiffness is so low, however, that the contact electrode (1) deforms upon contact with the plant (5). In FIG. 5(*c*) the contact electrode (1) has moved a little further in the direction (2-2). The deformation of the contact electrode (1) has increased. In FIG. 5 (*d*) the contact electrode (1) has moved a little further in the direction (2-2).

The deformation of the contact electrode (1) has increased further. The contact electrode (1) sweeps over the plant (5). In FIG. 5(*e*) the contact electrode (1) has moved a little further in the direction (2-2). The contact electrode (1) is no longer touching the plant (5). The contact electrode (1) has reacquired its original shape (the shape which it had in FIG. 5(*a*)). In the period of time from FIG. 5(*b*) to FIG. 5(*d*) the contact electrode is in contact with the plant (5) and can introduce energy in the form of electrical current into the plant (5).

Figure 6:
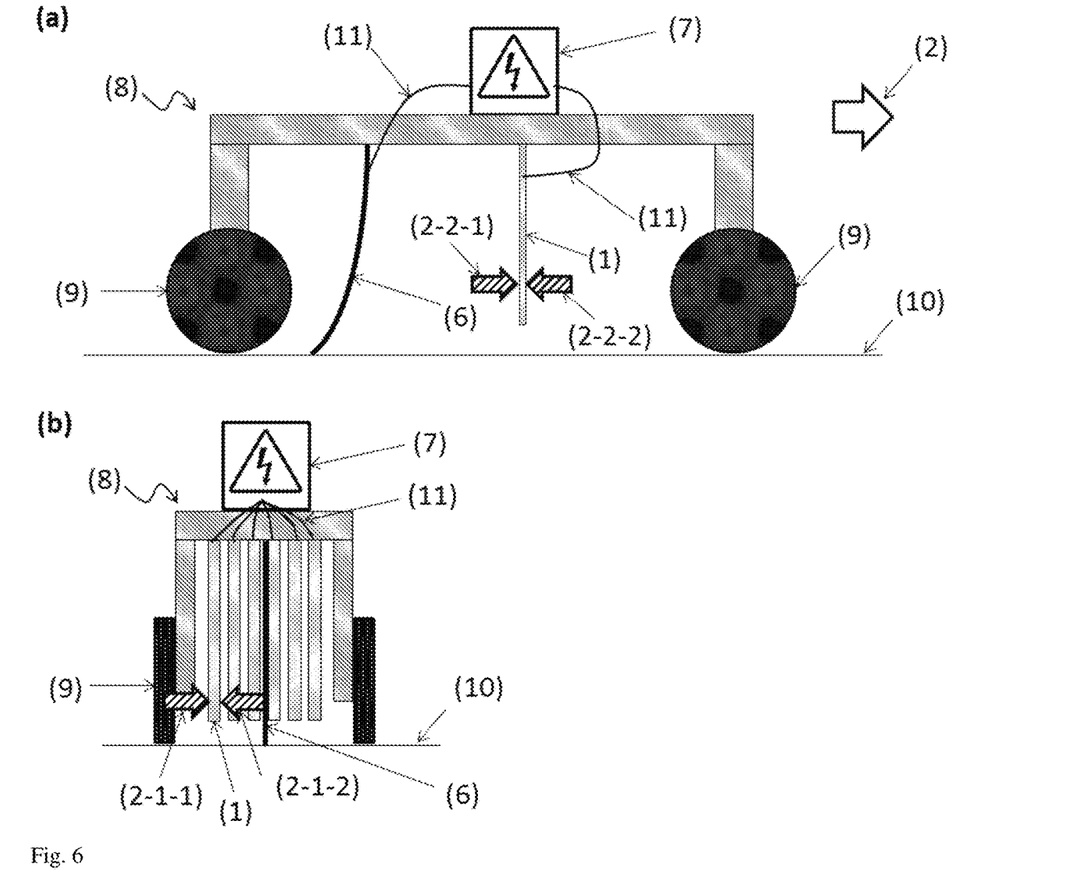

FIG. 6 shows by way of example and schematically one embodiment of the system according to the invention. FIG. 6(*a*) shows the system in a side view. FIG. 6(*b*) shows the system in a frontal view (from the direction (2) in which the system moves).

The system is embodied as a vehicle (8) that can move over a ground (10) at least in one direction of movement (2) by means of wheels (9).

A plurality of contact electrodes (1) are fitted to the vehicle (8). The contact electrodes (1) are fitted to the vehicle (8) in a suspended fashion. The contact electrodes (1) are arranged in lamellar-like fashion next to one another at a constant distance from one another. The contact electrodes (1) are arranged transversely (at an angle of 90° or 270°) relative to the direction of movement (2). The contact electrodes (1) have a length, a width and a thickness. The length extends in the direction of the force of gravity of the earth. The thickness extends in the direction of the direction of movement (2). The width extends in a direction transversely (at an angle of 90° or 270°) relative to the direction of movement (2). The contact electrodes (1) are anisotropic with regard to their bending stiffness. The bending stiffness of the contact electrodes (1) with respect to an external force (2-2-2) that acts on the contact electrodes (1) in a direction opposite to the direction of movement (2) is less than the bending stiffness of the contact electrodes (1) with respect to an external force (2-1-2) that acts on the contact electrodes (1) in a direction transversely with respect to the direction of movement (2). The contact electrodes (1) are embodied in a symmetrical fashion, such that the bending stiffness with respect to a force (2-2-1) that acts on the contact electrodes (1) in the direction of the direction of movement (2) is of just the same magnitude as the bending stiffness with respect to the force (2-2-2) that acts on the contact electrodes (1) counter to the direction of movement (2); likewise, the bending stiffness with respect to a force (2-1-1) is of just the same magnitude as the bending stiffness with respect to a force (2-1-2).

The anisotropic bending stiffness has the effect that the contact electrodes can deform in and counter to the direction of movement more readily than in a direction transversely relative to the direction of movement.

The contact electrodes (1) do not touch the ground (10). A distance prevails between the lower end of the contact electrodes (1) and the ground (10).

The vehicle (8) furthermore has a collector electrode (6). The collector electrode (6) is arranged behind the contact electrodes (1) in the direction of movement (2). The at least one collector electrode (6) touches the ground (10). It is conceivable for the wheels (9) to function as further collector electrodes.

The vehicle (8) furthermore has a voltage source (7). The voltage source (7) is connected via electrical lines (11) both to the contact electrodes (1) and to the at least one collector electrode (6). An electrical voltage can be applied between the contact electrodes (1) and the at least one collector electrode (6) by means of the voltage source (7).

Figure 7:
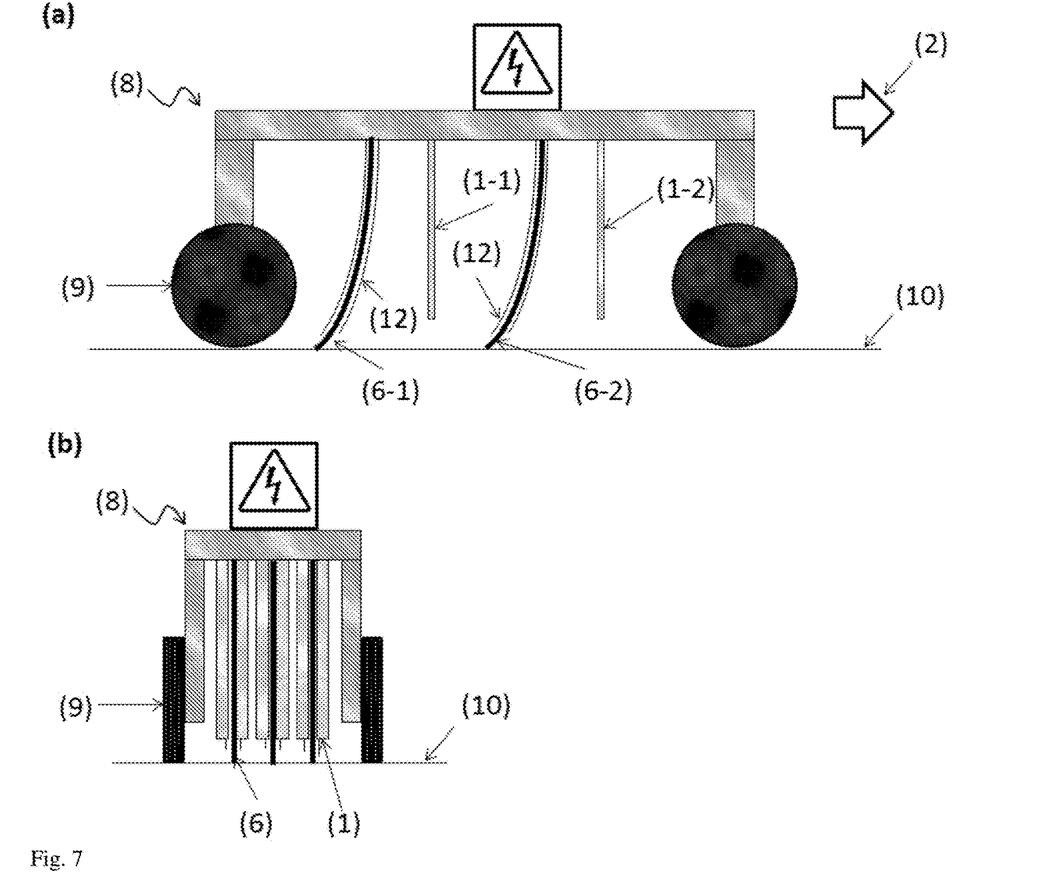

FIG. 7 shows a further embodiment of the system according to the invention. FIG. 7(*a*) shows the system in a side view. FIG. 7(*b*) shows the system in a frontal view (from the direction (2) in which the system moves).

The system is embodied as a vehicle (8). The vehicle (8) corresponds to the vehicle shown in FIG. 6 with the difference that now two rows (1-1, 1-2) of contact electrodes (1) are fitted to the vehicle (8) parallel to one another and one behind the other in the direction of movement (2), and furthermore two rows of collector electrodes (6-1, 6-2) are fitted to the vehicle (8) parallel to one another and one behind the other in the direction of movement (2), wherein in an upper section the collector electrodes (6) are provided with a sheathing that acts as an electrical insulator, while the collector electrodes (6) have no insulation in a lower section that is in contact with the ground (10). The insulation prevents an electrical short circuit if a contact electrode is hurled toward the rear in the direction of the collector electrodes and comes into contact with a collector electrode.

It is conceivable for the wheels (9) to function as further collector electrodes.

What is claimed is:

1. A system comprising:
    at least one contact electrode;
    at least one collector electrode;
    at least one voltage source for applying a voltage between the at least one contact electrode and the at least one collector electrode; and
    means for moving the system in a direction of movement;
    wherein the at least one contact electrode is fitted in a suspended fashion, wherein the at least one contact electrode has a length L, and wherein the at least one contact electrode is wound on a coil and the length L of the at least one contact electrode can be increased by unwinding from the coil and decreased by winding onto the coil; and
    wherein a bending stiffness of the at least one contact electrode with respect to an external force that acts on the at least one contact electrode counter to the direction of movement is lower than a bending stiffness of the at least one contact electrode with respect to an external force that acts on the at least one contact electrode transversely relative to the direction of movement.

2. The system as claimed in claim 1, further comprising a rail vehicle or a vehicle having means for moving on or along rails.

3. The system as claimed in claim 1, wherein the at least one contact electrode has a width B and a thickness D, wherein the length L extends along the direction of gravitational force, the thickness D extends along the direction of movement and the width B extends transversely relative to the direction of movement and wherein the length L is at least ten times the width B and the width B is at least three times the thickness D.

4. The system as claimed in claim 1, wherein the at least one contact electrode comprises a body composed of braided and/or twisted metal wires.

5. The system as claimed in claim 1, wherein a plurality of contact electrodes are arranged next to one another in lamellar fashion transversely or obliquely relative to the direction of movement.

6. The system as claimed in claim 1, wherein the length L of the at least one contact electrode is dimensioned such that a distance between a lower end, facing a ground surface, of the at least one contact electrode and the ground surface in the case of a stationary device is in a range of −0.5 meter to 0.5 meter, wherein a negative distance means that the contact electrode is touching the ground surface and that a region of the contact electrode that is in contact with the ground surface has a corresponding length.

7. The system as claimed in claim 1, further comprising a dispensing device that feeds contact electrode material if the length L of the at least one contact electrode has decreased on account of abrasion.

8. The system as claimed in claim 1, further comprising a separating device that separates worn contact electrode material in an automated manner.

9. The system as claimed in claim 1, wherein the at least one collector electrode can be contacted with one rail belonging to a track installation or with two rails belonging to a track installation.

10. The system as claimed in claim 1, wherein the voltage is obtained from the voltage source via an overhead line.

11. The system as claimed in claim 1, further comprising:
an extinguishing apparatus in a rear region of the system;
one or more sensors for detecting sparks and/or fire; and
a control unit, which causes the extinguishing apparatus to release an extinguishing composition if sparks and/or fire are/is detected by means of the one or more sensors.

12. The system as claimed in claim 11, wherein the means for moving the system includes a vehicle configured to move on or along rails in the direction of movement; and
wherein the extinguishing apparatus is disposed in a rear region of the vehicle.

13. The system as claimed in claim 12, further comprising one or more sensors for determining a constitution and/or form of a track installation situated ahead of the vehicle in the direction of movement, and a control unit configured to adapt a length of the at least one contact electrode and/or of the at least one collector electrode and/or voltage parameters to the constitution and/or form of the track installation situated ahead.

14. The system as claimed in claim 11, wherein the means for moving the system includes one or more sensors for determining a length and/or a degree of wear of the at least one contact electrode and/or of the at least one collector electrode.

15. The system as claimed in claim 1, further comprising one or more sensors for determining a length and/or a degree of wear of the at least one contact electrode and/or of the at least one collector electrode.

16. The system as claimed in claim 1, further comprising one or more sensors for determining a constitution and/or form of a track installation situated ahead in the direction of movement, and a control unit configured to adapt a length of the at least one contact electrode and/or of the at least one collector electrode and/or voltage parameters to the constitution and/or form of the track installation situated ahead.

17. A method comprising the steps of:
providing a system, wherein the system comprises:
at least one contact electrode;
at least one collector electrode;
at least one voltage source for applying a voltage between the at least one contact electrode and the at least one collector electrode; and
means for moving the system in a direction of movement;
wherein the at least one contact electrode is fitted in a suspended fashion, wherein the at least one contact electrode has a length L, and wherein the at least one contact electrode is wound on a coil and the length L of the at least one contact electrode can be increased by unwinding from the coil and decreased by winding onto the coil; and
wherein a bending stiffness of the at least one contact electrode with respect to an external force that acts on the at least one contact electrode counter to the direction of movement is lower than a bending stiffness of the at least one contact electrode with respect to an external force that acts on the at least one contact electrode transversely relative to the direction of movement;
applying a voltage between the at least one contact electrode and the at least one collector electrode;
moving the system over a region of earth in which plants are situated, and in the process:
contacting the at least one contact electrode with at least one part of at least one plant;
contacting the at least one collector electrode with:
a) ground in which the at least one plant is growing; and/or
b) another part of the at least one plant; and/or
c) at least one part of a neighboring plant; and
wherein a current flows between the at least one contact electrode and the at least one collector electrode, which current flows at least through a part of the at least one plant and weakens or destroys the plant.

18. A system comprising:
at least one contact electrode;
at least one collector electrode;
at least one voltage source for applying a voltage between the at least one contact electrode and the at least one collector electrode;
one or more sensors for determining a length and/or a degree of wear of the at least one contact electrode and/or of the at least one collector electrode; and
means for moving the system in a direction of movement;
wherein the at least one contact electrode is fitted in a suspended fashion; and
wherein a bending stiffness of the at least one contact electrode with respect to an external force that acts on the at least one contact electrode counter to the direction of movement is lower than a bending stiffness of the at least one contact electrode with respect to an external force that acts on the at least one contact electrode transversely relative to the direction of movement.

\* \* \* \* \*